United States Patent
Trumler et al.

(10) Patent No.: US 8,919,491 B2
(45) Date of Patent: Dec. 30, 2014

(54) SILENCER DEVICE FOR A FLUID LINE AND HEATING UNIT HAVING A SILENCER DEVICE

(75) Inventors: Harald Trumler, München (DE); Marco Pietrzyk, München (DE); Werner Zimmerman, Gröbenzell (DE); Nikolaus Gerhardt, Oberroth (DE); Peter Neidenberger, Olching/Neu-Esting (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 13/880,721

(22) PCT Filed: Oct. 26, 2011

(86) PCT No.: PCT/EP2011/068724
§ 371 (c)(1),
(2), (4) Date: Aug. 28, 2013

(87) PCT Pub. No.: WO2012/055900
PCT Pub. Date: May 30, 2012

(65) Prior Publication Data
US 2013/0327584 A1 Dec. 12, 2013

(30) Foreign Application Priority Data
Oct. 26, 2010 (DE) .................. 10-2010-049-578

(51) Int. Cl.
*G10K 11/00* (2006.01)

(52) U.S. Cl.
USPC ............ 181/196; 181/212; 181/227; 181/228

(58) Field of Classification Search
USPC .................. 181/196, 212, 227, 228
See application file for complete search history.

(56) References Cited

U.S. PATENT DOCUMENTS

| 2,075,263 | A | 3/1937 | Bourne |
| 2,075,265 | A | 3/1937 | Bourne et al. |

(Continued)

FOREIGN PATENT DOCUMENTS

| DE | 102005032319 A1 | 1/2007 |
| DE | 102007042869 A1 | 3/2009 |

(Continued)

OTHER PUBLICATIONS

International Search Report—(PCT/EP2011/68724 filed Oct. 26, 2011) date mailed Mar. 22, 2012.

*Primary Examiner* — Forrest M Phillips
(74) *Attorney, Agent, or Firm* — Fitch, Even, Tabin & Flannery LLP

(57) ABSTRACT

The present invention relates to a silencer device for a fluid line which comprises a resonator arrangement which comprises a first resonator tube comprising a first resonator chamber designed for a λ/4 damping of at least one sound wavelength, wherein the first resonator tube comprises a first longitudinal direction, two end walls facing each other in the first longitudinal direction and a first side wall extending between the end walls, and wherein the first resonator chamber is formed between the first side wall and the end walls of the first resonator tube. The resonator arrangement further comprises a second resonator tube comprising a second resonator chamber designed for a λ/4 damping of at least one sound wavelength, wherein the second resonator tube comprises a second longitudinal direction, two end walls facing each other in the second longitudinal direction and a second side wall extending between the end walls, and wherein the second resonator chamber is formed between the second side wall and the end walls of the second resonator tube. The invention further relates to a heating device comprising such a silencer device.

13 Claims, 4 Drawing Sheets

(56) References Cited

U.S. PATENT DOCUMENTS

| | | | |
|---|---|---|---|
| 3,685,616 A * | 8/1972 | Malkiewicz | 181/266 |
| 4,450,932 A * | 5/1984 | Khosropour et al. | 181/211 |
| 5,952,625 A * | 9/1999 | Huff | 181/265 |
| 6,595,319 B1 * | 7/2003 | Huff | 181/250 |
| 6,702,190 B1 * | 3/2004 | Nohl et al. | 237/12.3 C |
| 6,769,511 B1 * | 8/2004 | Brooks et al. | 181/241 |
| 7,798,286 B2 * | 9/2010 | Skowronski et al. | 181/266 |
| 8,302,732 B2 * | 11/2012 | Gorke et al. | 181/265 |
| 8,490,744 B2 * | 7/2013 | Nakamura et al. | 181/213 |
| 2001/0045322 A1 * | 11/2001 | Nilsson et al. | 181/227 |
| 2004/0000448 A1 * | 1/2004 | Santos | 181/251 |

FOREIGN PATENT DOCUMENTS

| | | |
|---|---|---|
| EP | 2192290 A1 | 6/2010 |
| WO | 2009009119 A1 | 1/2009 |

* cited by examiner

SILENCER DEVICE FOR A FLUID LINE AND HEATING UNIT HAVING A SILENCER DEVICE

CROSS REFERENCE TO RELATED APPLICATIONS

This application is a U.S. national phase application of International Application No. PCT/EP20111068724, filed Oct. 26, 2011, designating the United States, which claims benefit from Germany Application No. 10 2010 049 578.6, filed Oct. 26, 2010, which are hereby incorporated herein by reference in their entirety.

The present invention relates to a silencer device for a fluid line and a heating device comprising a silencer device.

In many cases nowadays pneumatic or hydraulic power units are used which may generate quite a substantial noise pollution. Particularly in case of power units used in the close vicinity of space generally used by people this may result in substantial disturbances. For example, in case of motor vehicles it is impossible for a driver and passengers to escape noise pollution caused by power units present in the vehicle such as, for example, a heating device. In a heating device particularly the intake area of a fluid such as air may constitute a significant source of noise.

In known silencer devices often absorption materials are used which are to accomplish a noise reduction. Such absorption materials may, for example, be disposed around intake pipes of a heating device. However, absorption materials are usually expensive and do not always attain a desired noise reduction in all relevant frequency ranges. Particularly in the low frequency range of less than 1 kHz sound frequency most known absorber materials are no efficient silencers. For a sufficient attenuation, therefore, a substantial quantity of absorption material has to be used which leads to an increase of the costs of the silencer device. Furthermore, the silencer device has to be dimensioned sufficiently large to be capable of accommodating the absorption material. Particularly for a use in mobile applications such as a vehicle, however, a compact design is desirable.

It is therefore the object of the present invention to provide a silencer device for a fluid line particularly for motor vehicles and particularly for heating devices for motor vehicles which can be produced at low costs and attains a desired noise reduction particularly also in low frequency ranges.

This object is solved by the features of the independent claims.

Further advantageous embodiments and further developments of the invention can be derived from the dependent claims.

According to the invention, a silencer device for a fluid line comprising a resonator arrangement is provided. The resonator arrangement comprises a first resonator tube comprising a first resonator chamber designed for $\lambda/4$ damping of at least one sound wavelength, wherein the first resonator tube comprises a first longitudinal direction, two end walls facing each other in the first longitudinal direction and a first side wall extending between the end walls, and wherein the first resonator chamber is formed between the first side wall and the end walls of the first resonator tube, as well as a second resonator tube comprising a second resonator chamber designed for $\lambda/4$ damping of at least one sound wavelength, wherein the second resonator tube comprises a second longitudinal direction, two end walls facing each other in the second longitudinal direction and a second side wall extending between the end walls, and wherein the second resonator chamber is formed between the second side wall and the end walls of the second resonator tube. The first resonator tube and the second resonator tube are connected to each other via a first connecting orifice between the first side wall and the second side wall so that sound is transmitted. The first resonator tube is connected or connectable to the fluid line via a port orifice so that sound is transmitted. Consequently, a compact series connection of the resonator tubes of the resonator arrangement is obtained. For a $\lambda/4$ damping of a wavelength each of the resonator tubes is designed so that its resonant length is equivalent to a quarter of a wavelength of a specific disturbing noise or a specific disturbing noise component. In general, the distance between the end walls of a resonator tube can be referred to as the resonator length. The distance between an end wall of a resonator and the edge of a connecting orifice or a port orifice of the resonator tube facing this end wall can be referred to as the resonant length. It is conceivable that a resonator tube comprises two orifices, for example a port orifice and a connecting orifice. Correspondingly, a plurality of resonant lengths may exist for one resonance tube. Apart from that a single orifice may, when indicated, have different resonant lengths with respect to both end walls of a resonator tube. Within a resonator arrangement the resonator tubes may have identical resonator lengths and/or resonant lengths. In case of identical resonant lengths a particularly good attenuation of the associated wavelength is obtained since a plurality of resonator tubes contribute to the attenuation. In case of different resonator lengths and/or resonant lengths the bandwidth of the attenuation can be significantly increased. A series connection of the resonator tubes will result in further resonant lengths respectively extending from an end wall to the edge of a connecting orifice or the port orifice. These further resonant lengths extend across more than one resonator tube. For these further resonant lengths the length between associated side walls or the thickness of an inner wall which a sound wave has to pass through may play a role. It is useful to dimension the resonator lengths, resonant lengths and other lengths to be taken into consideration which have to be passed by sound waves in the silencer device so that the desired attenuation of specific frequencies or wavelengths of sound waves is achieved. According to the invention, therefore, particularly the first resonator tube may serve as a $\lambda/4$ tube for a first wavelength or a first frequency while the resonator arrangement as a whole including the first and second resonator tubes connected in series and having a combined overall length functions as a $\lambda/4$ tube for a low frequency. The second resonator tube may, accordingly, contribute to the attenuation of the first wavelength or be designed for damping of a further wavelength. By dimensioning and positioning the connecting orifice and/or the port orifice the damping characteristics of the individual resonator tubes and the entire resonator arrangement can be defined. A connecting orifice may be formed so that it renders a sound-transmitting connection between associated side walls possible. In particular, a connecting orifice may be a continuous orifice between the side walls or in an inner wall. Usefully the overall orifice area of a connecting orifice or a port orifice is equal to or larger than a cross-sectional area of the fluid line. The cross-sectional area of the fluid line may have a normal which is parallel to a fluid flow through the line. Accordingly, a sufficient sound diversion into the resonator arrangement can be accomplished, and a sufficient pressure compensation for the desired attenuation can be ensured. In general, a side wall of a resonator tube may, in particular, extend parallel to a normal direction of one of the end walls of the resonator tube. A side wall may, in particular, designate a wall facing the inside of a resonator tube or the resonator chamber. A side wall may be formed by the associated sides of two walls enclosing the resonator tube or the resonator chamber. It may be contemplated that a connecting orifice comprises a normal extending orthogonally with respect to the longitudinal direction of one of the resonator tubes allocated to it. A longitudinal direction may, in particular, be the direction of the largest extension of a resonator tube. The longitudinal direction may be defined by the opposed end walls. Each of the end walls may be formed as a continuous element without holes. Usefully an end wall is capable of reflecting the sound waves to be attenuated. The resonator arrangement may be integrally formed. However, it is also feasible that the resonator arrangement is formed by a plurality of elements. The components of a multi-part resonator arrangement may, at least partly, be fixedly connected to each other in a suitable manner, for example by welding, screwing, adhering or snap-fitting. Particularly, it may be contemplated that the resonator arrangement comprises two or more than two components fit into each other. The resonator arrangement or the components of the resonator arrangement may be formed of any suitable material, for example of metal or preferably a hard plastic material such as, for example, a polyamide material. A resonator tube may have a circular, rectangular, particularly square, or any other suitable cross section. The silencer device is particularly suitable for a heating device, particularly a heating device of a motor vehicle. It may be provided in the intake area of a heating device for motor vehicles. The fluid line may comprise a supply port and a discharge port. In particular, the fluid line may be an intake pipe, or it may be connected or connectable to an intake pipe. It is conceivable that the fluid line is an air intake line, for example for a heating device. The resonator arrangement may be formed so that it fully encloses the fluid line. It may be useful that the connecting orifice and/or the port orifice go fully around the associated side walls or the fluid line by respectively defining, for example, an orifice circle having a specific orifice width. The orifice widths of different orifices may be identical or different. A sound-transmitting connection is provided to transmit sound waves, if possible without changing their frequency. Such a connection may, for example, be realised via an orifice. It may also be contemplated that a membrane is disposed above an orifice. A sound-transmitting connection or orifice may also be capable of guiding a fluid. A fluid may be a liquid or a gas, particularly air. The silencer device may comprise an absorption material. The absorption material may enclose the fluid line and/or a fluid supply and/or a fluid outlet. The resonator arrangement may generally be formed as an arrangement of resonator tubes concentrically enclosing each other and connected to each other by connecting orifices. In this case the resonator tubes may concentrically enclose the fluid line.

It may be contemplated that the first longitudinal direction and the second longitudinal direction extend parallel to each other. Accordingly, the resonator tubes may be arranged close to each other which renders a compact design of the resonator arrangement possible.

The first and the second side wall may have a common inner wall in which the first connecting orifice is provided. In general, an inner wall may respectively be designed so that it, at least partly, forms the side wall of two adjacent resonator tubes or a resonator tube and the fluid line. Consequently, for example, the first side wall and the second side wall are respectively formed by the side of the inner wall facing the first or second resonator chamber. A common inner wall may be multi-layered. It may also be contemplated that the common inner wall is integrally formed. This results in a particularly compact design of the resonator arrangement.

It may be contemplated that the first connecting orifice is disposed in an end section of the first and/or the second resonator tube. An end section may be positioned in the area of an end wall. In particular, the connecting orifice may extend from the end wall to an edge facing the opposing end wall. Consequently, the resonator length of the resonator tubes can be used for defining the resonant length to keep the overall extension of the silencer device small. In particular, it may be contemplated that the first connecting orifice interrupts at least a section of a connection of the inner wall or of one of the side walls to the end wall.

In a further development the port orifice may be provided in an end section of the first resonator tube. Here the port orifice may be provided in the end section of the resonator tube opposed to the end section in which the connecting orifice is provided. Therefore, substantially the full length of the resonator tube connected to the fluid line can be used as the resonant length. The first connecting orifice may be provided in an end section of the first resonator tube, i.e. on or in the vicinity of one of the end walls, while the port orifice may be provided in the other end section, i.e. on or in the vicinity of the other end wall of the first resonator tube. Therefore, the orifices do not directly face each other, whereby the length of the resonator tubes can be made use of.

Usefully, the silencer device comprises the fluid line. In this way the silencer device may be connected to, for example, a fluid connection of an apparatus to be dampened such as a heating device of a motor vehicle via the fluid line in a simple manner. It is conceivable that the fluid line is, at least partly, formed by a wall forming a side wall of one of the resonator tubes. It may also be contemplated that the silencer device is formed so that it is designed without a fluid line and is subsequently mounted on an existing fluid line. To this end it may possibly be necessary to provide the fluid line with an associated port orifice to which the silencer device is or may be connected.

The silencer device may further comprise a third resonator tube comprising a third resonator chamber designed for a $\lambda/4$ damping of at least one sound wavelength, wherein the third resonator tube comprises a third longitudinal direction, two end walls facing each other in the third longitudinal direction and a third side wall extending between the end walls, and wherein the third resonator chamber is formed between the third side wall and the end walls of the third resonator tube, wherein the third resonator tube is connected or connectable to the fluid line via a second port orifice. The third resonator tube may accomplish the attenuation of a further sound frequency depending on the selected length of the third resonator tube. It is also feasible to provide additional resonator tubes connected or connectable to the fluid line via separate port orifices.

It may be useful that the resonator arrangement further comprises at least one further resonator tube comprising a further resonator chamber designed for a $\lambda/4$ damping of at least one wavelength of a sound signal, wherein the further resonator tube comprises a further longitudinal direction, two end walls facing each other in the further longitudinal direction and a further side wall extending between the end walls, and wherein the further resonator chamber is formed between the further side wall and the end walls the further resonator tube. The further resonator tube and the first or the second resonator tube are connected to each other by a second connecting orifice between the further side wall and the first or second side wall so that sound is transmitted. Consequently a series connection of at least three resonator tubes may be provided in the resonator arrangement. The further longitudinal direction or longitudinal directions may be parallel to the first and/or second longitudinal direction. For the arrangement of the second connecting orifice what was explained above for the first connecting orifice applies analogously. If three resonator tubes are used the resonator arrangement functions as a λ/4 tube for different frequencies. Namely, each resonator tube individually functions as a λ/4 tube with its length. In case of different lengths of the resonator tubes different frequencies may thus be dampened by the individual resonator tubes alone. Furthermore, the resonator tubes have an effect with the sums or lower sums of their lengths, i.e., for example, the first resonator tube combined with the second resonator tube, the second resonator tube combined with the third resonator tube as well as all three resonator tubes together respectively as a λ/4 tube for a wavelength corresponding to the aggregate resonant length. Of course it is possible to connect more than three resonator tubes to each other via suitable connecting orifices so that sound is transmitted. Respectively two of the resonator tubes connected to each other may have a common inner wall as described above. The first connecting orifice may be provided in an end section of the second resonator tube, i.e. on or in the vicinity of one of the end walls, while the second connecting orifice may be provided in the other end section, i.e. on or in the vicinity of the other end wall of the second resonator tube. Therefore the connecting orifices do not directly face each other, whereby the length of the resonator tubes can be made use of.

The first longitudinal direction may extend parallel to a longitudinal direction of the fluid line and/or a flow direction of fluid in the fluid line. This enables a particularly compact design of the silencer device. Furthermore, it may be contemplated that a port orifice comprises a normal positioned orthogonally with respect to the flow direction of the fluid in the fluid line. Consequently, on the one hand, a good diversion of irritating noise can be effected through the port orifice, and, on the other hand, the port orifice has the smallest possible effect on the flow of the fluid in the fluid line. The fluid may, in particular, be air taken in or discharged.

It is particularly advantageous that the silencer device comprises two or more resonator arrangements respectively connected or connectable to the fluid line via a port orifice. Here, each resonator arrangement may be provided with at least two resonator tubes arranged as described above and connected to each other via connecting orifices. It is particularly useful that the lengths of the resonator tubes of the resonator arrangements are different. Furthermore, it is possible that the lengths of the resonator tubes within a resonator arrangement are different. In this way a large spectrum of frequencies can be attenuated. The resonator arrangements may be connected in series in flow direction. It is also feasible to arrange the resonator arrangements opposite to each other with respect to the fluid line. In this case each resonator arrangement should be connected or connectable to the fluid line via a separate, correspondingly designed port orifice only partly going around the fluid line. A combination of both arrangement concepts comprising a plurality of resonator arrangements is also feasible.

Further, a silencer device is feasible which is, alternatively or in addition to some or a plurality of the abovementioned features, connected or connectable to an absorption device.

The absorption device may comprise a plurality of layers, for example an impermeable layer and an absorption layer. The absorption layer may be a sound absorbing layer which may be an elastic layer. It is feasible that the absorption layer comprises, for example, an open-pored foam as a sound-absorbing material. The impermeable layer may comprise a fluid-proof material which may be elastic. In particular, the impermeable layer may comprise a closed-cell foam. The impermeable layer may be connected to the absorption layer by material engagement. It may be contemplated that the impermeable layer is connected to the absorption layer as a lining. The connection or lining between the absorption layer and the impermeable layer may, for example, be formed by a suitable adhesive, a wax, a resin, or by a thermal treatment, for example dry lamination, wet lamination and/or thermal lamination. It may, particularly, be contemplated that the absorption layer and the impermeable layer are integrally formed. In this way the absorption device can provide for both noise reduction and a lining. In this way an additional separate sealing can be omitted which facilitates the production and assembly of the silencer device. The impermeable layer may be formed and disposed so that it fully covers and seals a contact area between the silencer arrangement and the connecting body. It is useful that the absorption layer is wider than the impermeable layer to render a good sound absorption possible. The absorption layer may comprise a suitable sound-absorbing material, for example an open-pored foam suitable for noise reduction in a specific frequency range. The impermeable layer may be impervious to sound. Particularly, it may be contemplated that the impermeable layer is formed so as not to direct sound from the silencer device to the outside. The material of the impermeable layer may have a sound-absorbing or reflecting effect in a suitable frequency range. The silencer device may be connectable or connected to a fluid connection via a connecting body. The connecting body may, for example, comprise a suitable pipe connection for connecting it to a fluid connection. It is feasible that the silencer device is at least partly accommodated in the connecting body in a connecting area. To this end the connecting body may, for example, comprise a side wall enclosing the silencer device. The absorption device may be disposed or accommodated in the connecting body and/or between the connecting body and the silencer device. In particular, the absorption device may thus be connected or connectable to the silencer device via the connecting body. It may be contemplated that the absorption device is accommodated in the connecting body so that the sealing mechanism seals the connecting body against the silencer device. In particular, the absorption device may be accommodated in the connecting body so that it seals the silencer device and/or a boundary wall and/or an outer wall of the silencer device against the connecting body. In addition, for example, the absorption device may be accommodated so that the impermeable layer abuts to the inside of a side wall of the connecting body and/or a boundary wall and/or outer wall of the silencer so as to seal them. Here the impermeable layer may non-positively and/or positively abut to the boundary wall and/or the side wall and/or outer wall. In the absorption device a fluid-conducting passage may be provided which is capable of providing a fluid-conducting connection between the fluid line of the silencer device and a fluid connection. The connecting body and the silencer device may be non-positively and/or positively connected or connectable to each other. It is feasible that a boundary wall and/or an outer wall of the silencer device comprise at least one elastic area which may, for example, be a curved area of the wall. The connecting body may be perched or pushed onto the silencer device.

In particular, it may be contemplated that the elastic area is compressed by the connecting body. At the same time a restoring force of the elastic area may provide for a non-positive and/or positive connection between the connecting body and the boundary wall and/or outer wall. For example, the boundary wall and/or outer wall may be pressed against a surrounding side wall of the connecting body. It may be contemplated that the connecting body is connected or connectable to the silencer device via a snap-on connection.

The invention further relates to a heating device, particularly a heating device for a motor vehicle, comprising a silencer device as described above. The fluid line may, in particular, be formed as a line for intaken air for the heating device.

The invention will now be explained by way of example with the aid of preferred embodiments with reference to the accompanying drawings in which.

In the following description of the Figures identical numerals designate the same or functionally similar components.

Figure 1:
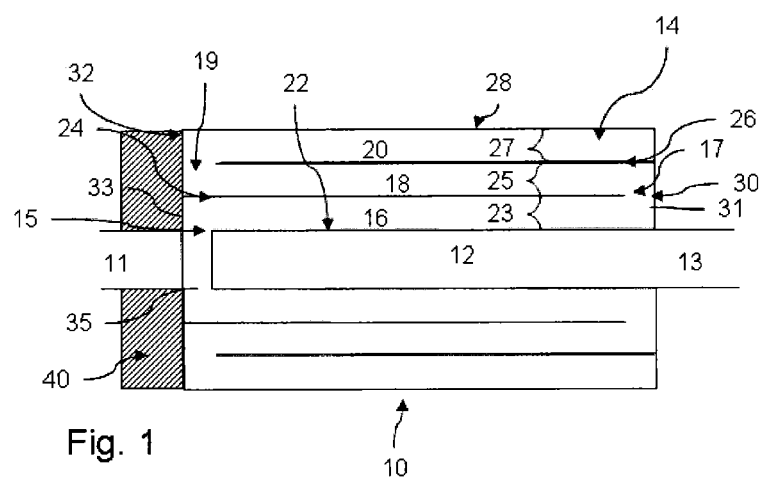
FIG. 1 shows a schematic representation of a first silencer device.

FIG. 1 shows a schematic representation of a silencer device 10. The silencer device 10 comprises a fluid line 12 through which a fluid, particularly air, can be conducted. The fluid line comprises a fluid outlet 11 and a fluid supply 13. Correspondingly, a flow direction of the fluid in the fluid line 12 extends from 13 to 11, i.e. from right to left in the drawing. A sound propagation from a power unit such as a heating device connected at the fluid outlet 11 accordingly takes place in the opposite direction. The fluid line 12 is surrounded by a resonator arrangement 14 comprising three resonator tubes 16, 18 and 20 connected in series and arranged concentrically with respect to each other. The resonator tube 16 is connected to the fluid line 12 via a port orifice 15 in a wall 22 so that sound is transmitted. Only a marginal fluid exchange takes place via the port orifice 15 since the resonator arrangement 14 does not comprise any outlet. The wall 22 forms an inner part of a side wall 23 for the resonator tube 16 connected to it. An inner wall 24 forms another, outer part of a side wall 23 of the resonator tube 16. The inner wall 24 further forms an inner part of the side wall 25 of the resonator tube 18 and may be regarded as a common inner wall of the resonator tubes 16 and 18. Further, another inner wall 26 is provided which forms an outer part of the side wall 25 and an inner part of a side wall 27 of the adjacent resonator tubes 18 and 20. An outer wall 28 defines the resonator arrangement 14 toward the outside and forms another, inner part of the side wall 27 of the resonator tube 20. The resonator tubes 16, 18 and 20 are closed by boundary walls 30, 32 extending orthogonally with respect to the inner walls. An end wall 31 for the resonator tube 16 is formed by the boundary wall 30. The other boundary wall 32 forms a second end wall 33 of the resonator tube 16. The end walls 31, 33 are opposed to each other in relation to a longitudinal direction of the resonator tube 16. Analogously, the boundary walls 30, 32 form end walls of the resonator tubes 18 and 20. The end walls of a resonator tube respectively face each other with respect to a longitudinal direction of the allocated resonator tube. Of course it is also possible that, instead of common boundary walls, each resonator tube is separately produced and comprises its own, separately formed end walls. The end walls and the side walls are substantially impervious to the sound to be absorbed. In particular, the end walls are capable of reflecting sound waves to be dampened. Between the side walls and the end walls of a resonator tube a resonator chamber (not designated) is formed, respectively. As outlined in FIG. 1 the port orifice 15 fully goes around the fluid line 12. The overall surface area of the circumferential port orifice 15 is selected so that it is identical to the cross-sectional area of the fluid line 12. The resonator tube 16 is connected to the resonator tube 18 via a connecting orifice 17 so that sound is transmitted. The connecting orifice 17 is provided in the inner wall 24 located between these resonator tubes and thus extends between the side walls 23, 25 of these resonator tubes, respectively. Likewise the resonator tube 18 is connected to the resonator tube 20 via a connecting orifice 19 provided in the inner wall 26 so that sound is transmitted. The connecting orifices 17, 19 are respectively positioned in an end section of the resonator tubes. In particular, the connecting orifices 17, 19 follow associated end walls or extend perpendicularly away from the adjacent end walls. The connecting orifices 17, 19 respectively form a circle encircling the associated inner wall 24, 26. The total surface area of a connecting orifice 17, 19 is identical to the cross-sectional area of the fluid line 12. The resonator tubes 16, 18 and 20 are formed so that they form a concentric arrangement around the fluid line 12. An absorption device 40 is disposed upstream of the resonator arrangement 14 in the sound emission direction. The absorption device 40 may fully surround the fluid line 12 or the fluid outlet 11 and may be designed for high frequency attenuation. The absorption material of the absorption device 40 may, in this case, be formed of a foam material exhibiting good absorption characteristics particularly at high frequencies. Since the absorption material is intended to dampen relatively high frequencies (of more than one kHz) no particularly thick absorption material layer is required so that the absorption material may, for example, be limited to the installation height of the resonator arrangement. The resonator arrangement 14 is usefully dimensioned so that the resonator tubes 16, 18, 20 have identical resonator lengths from end wall to end wall. The resonator length may, in this example, be 80 mm. The port orifice 15 and the connecting orifices 17, 19 may have a width of 5 mm. An individual resonator 16, 18, 20 therefore functions as a $\lambda/4$ silencer for sound waves having a frequency of 1002 Hz. Two adjacent resonator tubes, for example the resonator tubes 16 and 18, together function as a $\lambda/4$ silencer for a frequency of 521 Hz. Three resonator tubes together function as a $\lambda/4$ silencer for a frequency of 350 Hz. The dampened frequencies are all but in an integer proportion since the respective total resonant length is composed of the resonant length of one of the resonator tubes including the orifice involved in the resonance and the resonator length or the resonator lengths of the resonator tubes the end walls of which play a role in the resonance. Furthermore, the thickness of the walls 22, 24, 26 plays a role. For example, a resonant length of the resonators 16 and 18 is determined by the length from the edge of the port orifice 15 to the end wall 31, the length of the resonator 18 between the end walls and the thickness of the inner wall 24. It is to be understood that a $\lambda/4$ damping for different sound wavelengths is effected by the resonator arrangement 14. The resonator tubes 16, 18, 20 are oriented parallel to each other and parallel to the longitudinal direction of the fluid line 12 or to the flow direction of the fluid in the fluid line 12 with respect to their longitudinal directions. The silencer device shown is particularly suitable for a heating device of a motor vehicle.

Figure 2:
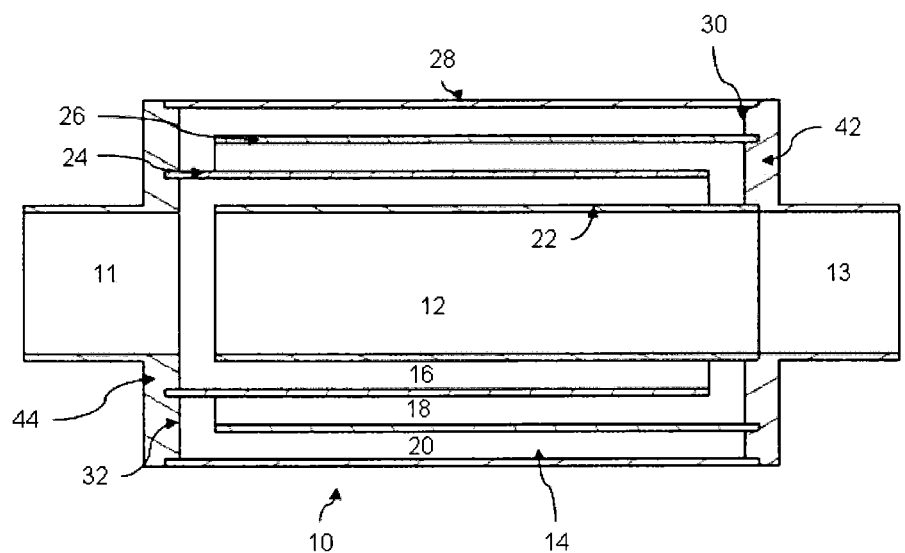
FIG. 2 shows a schematic representation of another silencer device.

FIG. 2 shows a variant of a silencer device 10 of FIG. 1, wherein only the differences to FIG. 1 will be addressed in more detail. In this variant two connecting bodies 42, 44 are provided which respectively provide a fluid connection 13, 11 for connecting the fluid line 12 to other components (not shown) or for supplying fluid or for discharging fluid as described above. The connecting body 42 supports the inner walls 22 and 26. The connecting body 44 supports the inner wall 24. Above the outer wall 28, the connecting bodies 42, 44 are connected to each other, for example by snap-fitting, welding or adhering. The connecting body 42 comprises a boundary wall 30 forming the end walls of the resonator tubes 16, 18 and 20 on the side of the connecting body 42. Analogously, the connecting body 44 forms a boundary wall 32 and thus the opposing end walls of the resonator tubes 16, 18, 20. The resonator arrangement 14 may, in this example, be assembled by simply connecting two components by insertion, namely the connecting bodies 42, 44. It is also feasible that the outer wall 28 is formed as a separate component connected to the connecting bodies 42, 44 as described above.

Figure 3:
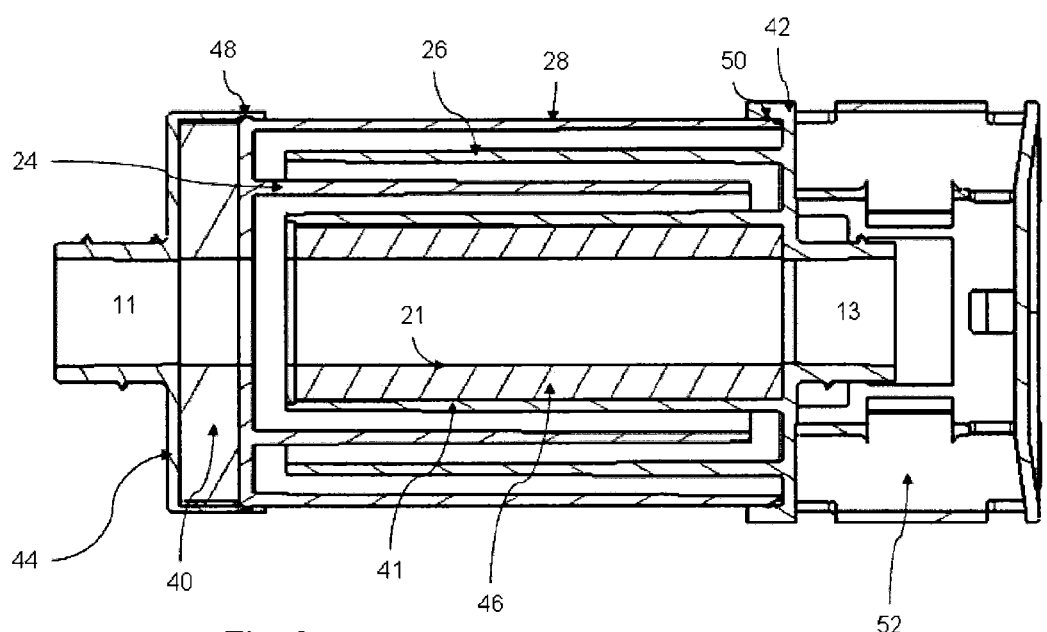
FIG. 3 shows a schematic representation of another silencer device comprising an absorption material and additional components attached to the silencer device.

FIG. 3 shows another variant of a silencer device 10 of FIG. 1, wherein only the differences to FIGS. 1 and 2 are described in more detail. In this example an absorption device 46 is provided between the fluid line 12 and an inner wall 41 of the resonator tube 16. The absorption device 46 encloses the fluid line 12. Consequently the wall 41 and the layer of absorption material forming the absorption device 46 together may be regarded as fulfilling the function of the inner wall 22 of FIG. 1. It is feasible to form the absorption material so that it is fluid-tight and therefore, at the same time, constitutes a boundary for the fluid conducted in the fluid line 12. In addition, for example, the absorption material may optionally be suitably coated with a coating 21 pervious to sound. In this variant it can be seen that the connecting body 44 is a component manufactured separately from the outer wall 28. The boundary wall 32 is formed a wall integrally formed with the outer wall 28. The connecting body 42 supports the inner walls 26 and 41. Thus the connecting body 42 and the outer wall 28 may be connected to each other by means of a snap-on connection 48 in a particularly simple manner. The connecting body 42 may also be connected to the outer wall 28 by a snap-on connection 50. Between the connecting body 44 and the bounding surface 32 a further absorption device 40 is accommodated. It may be designed for damping the same frequencies as the absorption device 46. The absorption device 40 may also be capable of damping other frequencies, particularly of damping lower frequencies. Namely, in the design shown here it is possible to form the absorption device 40 with an increased design depth as compared to the absorption device 46 since it extends substantially from the edge of the fluid line 12 to the height of an outer wall area of the resonator arrangement. In this way lower frequencies can be damped than by the comparably thinner absorption layer 46. On the connecting body 42 further a water separator 52 is provided which serves to separate water from the supplied air in a known manner.

Figure 4:
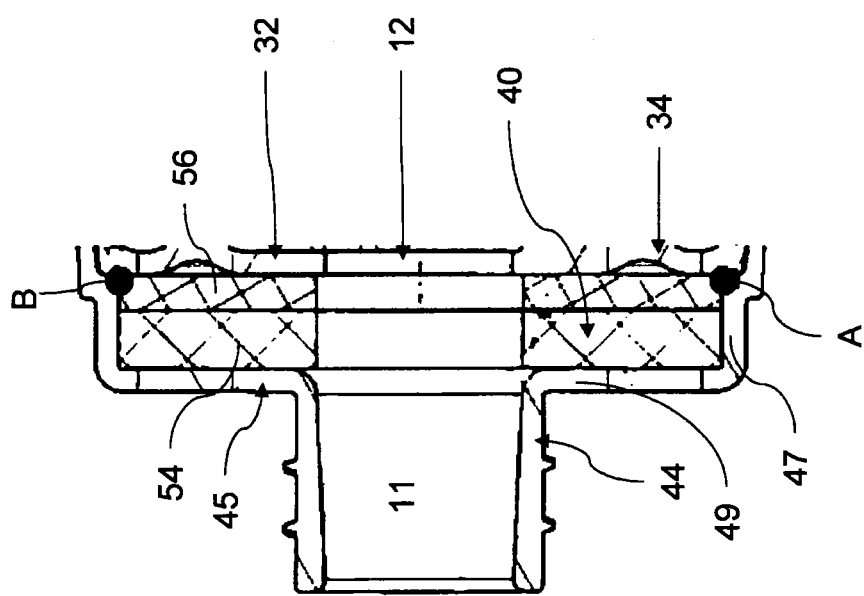
FIG. 4 shows a schematic representation of a connecting body for a silencer device.

FIG. 4 shows a schematic representation of a connecting body for a silencer device which may, in particular, be one of the silencer devices 10 described herein. In the mounted state shown the arrangement can be regarded as a silencer device comprising a connected connecting body. What is shown is a connecting body 44 providing a fluid connection 11 for the fluid line 12. In addition, the connecting body 44 comprises a pipe connection accommodated in a transverse wall 49 of a connecting body wall 45. The connecting body wall 45 further comprises a side wall 47. The transverse wall 49 extends approximately transversely with respect to the flow direction of a fluid in the fluid line and is formed between the pipe connection and the side wall 47. In this example the connecting body 44 which comprises the pipe connection and the connecting body wall 45 including the transverse wall 45 and the side wall 47 is integrally formed. The side wall 47 at least partly encloses the silencer device from the outside and accommodates it. In particular, the side wall 47 may at least partly enclose a boundary wall 32 and/or an outer wall 28 of the silencer device and/or contact it. The side wall 47 may be formed parallel to the fluid line 12. The connecting body 44 may, in particular, be perched or pushed onto the silencer device 10. The boundary wall 32 comprises a curved elastic area 34. Therefore the boundary wall 32 and/or an outer wall 28 of the silencer device connected to it can elastically adapt to the side wall 47 of the connecting body 44 enclosing it. Here a non-positive and/or positive connection between the silencer device 10 and/or the boundary wall 32 and/or an outer wall 28 and the connecting body 44 can be established. In particular, a non-positive and/or positive connection between the boundary wall 32 and/or outer wall 28 and the side wall 47 enclosing it can be established. In fact, the boundary wall 32 may be slightly compressed by the side wall 47 and will then in turn exert a pressure on the side wall 47 from the inside owing to its elastic properties provided by the elastic area. Between the connecting body wall 45 and the boundary wall 32 an absorption device 40 is accommodated. The absorption device 40 is therefore accommodated in an accommodation space defined by the boundary wall 32, the transverse wall 49 and the side wall 47. The absorption device 40 comprises an absorption layer 54 and an impermeable layer 56. The absorption layer 54 consists of a sound-absorbing material, for example an open-pored foam. The impermeable layer 56 may be formed of a fluid-tight elastic material, particularly from a closed-cell foam. The impermeable layer 56 is connected to the absorption layer 54 as a lining and/or by material engagement. This connection may, for example, be provided for by a suitable adhesive, a wax, a resin or a suitable thermal treatment, for example by wet laminating, dry laminating and/or thermal laminating. It is contemplated that the absorption device 40 and particularly the impermeable layer 56 are accommodated in the accommodation space so that the impermeable layer 56 provides for a sealing between the connecting body 44 and the silencer device 10 and/or the boundary wall 32. In particular, the impermeable layer 56 provides for a sealing at the points A and B where the side wall 47 of the connecting body 44 contacts the silencer device and particularly the boundary wall 32. The impermeable layer 56 is designed to fully cover and seal the contact area between the silencer device and the connecting body 44 which, in particular, comprises the points A and B in this example where the boundary wall 32 and the connecting body 44 contact. As a result it can be prevented that undesired fluids and contaminants enter from the outside via the connecting body 44. The impermeable layer 56 may be formed so that it does not transfer sound from the silencer device to the outside, but absorbs and reflects it. In this way the escape of disturbing noises from the silencer device is prevented. Owing to the lamination of the impermeable layer 56 and the absorption layer 54 a separate sealing, for example an O ring, can be omitted. In this way the assembly and the production of the silencer device 10 are significantly facilitated. It is to be understood that the absorption device 40 shown may also be used in the examples of FIGS. 1 to 3.

The features of the invention disclosed in the above description, in the drawings as well as in the claims may be important for the realisation of the invention individually as well as in any combination.

The invention claimed is:

1. A silencer device for a fluid line comprising a resonator arrangement which comprises:
    a first resonator tube comprising a first resonator chamber designed for $\lambda/4$ damping of at least one sound wavelength, wherein the first resonator tube comprises a first longitudinal direction, two end walls facing each other in the first longitudinal direction and a first side wall extending between the end walls, and wherein the first resonator chamber is formed between the first side wall and the end walls of the first resonator tube, a second resonator tube comprising a second resonator chamber designed for λ/4 damping of at least one sound wavelength, wherein the second resonator tube comprises a second longitudinal direction, two end walls facing each other in the second longitudinal direction and a second side wall extending between the end walls, and wherein the second resonator chamber is formed between the second side wall and the end walls of the second resonator tube, wherein the first resonator tube and the second resonator tube are connected to each other via a first connecting orifice between the first side wall and the second side wall so that sound is transmitted, and wherein, further, the first resonator tube is connected or connectable to the fluid line via a port orifice so that sound is transmitted, wherein the absorption device comprises an impermeable layer and an absorption layer, and wherein the impermeable layer comprises a fluid-proof elastic material.

2. The silencer device according to claim 1, wherein the first and second side wall have a common inner wall in which the first connecting orifice is provided.

3. The silencer device according to claim 1, wherein the first connecting orifice is disposed in an end section of the first or the second resonator tube.

4. The silencer device according to claim 1, wherein the port orifice is provided in an end section of the first resonator tube.

5. The silencer device according to claim 1, further comprising the fluid line.

6. The silencer device according to claim 1, further comprising a third resonator tube comprising a third resonator chamber designed for λ/4 damping of at least one sound wavelength, wherein the third resonator tube comprises a third longitudinal direction, two end walls facing each other in the third longitudinal direction and a third side wall extending between the end walls, and wherein the third resonator chamber is formed between the third side wall and the end walls of the third resonator tube, wherein the third resonator tube is connected or connectable to the fluid line via a second port orifice.

7. The silencer device according to claim 1, wherein the resonator arrangement further comprises at least one further resonator tube comprising a further resonator chamber designed for λ/4 damping of at least one sound wavelength, wherein the further resonator tube comprises a further longitudinal direction, two end walls facing each other in the further longitudinal direction and a further side wall extending between the end walls, and wherein the further resonator chamber is formed between the further side wall and the end walls of the further resonator tube, wherein the further resonator tube and the first or second resonator tube are connected by a second connecting orifice between the further side wall and the first or the second side wall so that sound is transmitted.

8. The silencer device according to claim 1, wherein the first longitudinal direction extends parallel to a longitudinal direction of the fluid line and/or or a flow direction of fluid in the fluid line.

9. The silencer device according to claim 1, wherein the silencer device comprises two or more resonator arrangements which are respectively connected or connectable to the fluid line via a port orifice.

10. The silencer device according to claim 1, wherein the first longitudinal direction and the second longitudinal direction extend parallel to each other.

11. The silencer device according to claim 1, wherein the impermeable layer is connected to the absorption layer by material engagement.

12. The silencer device according to claim 1, wherein the impermeable layer is connected to the absorption layer as a lining.

13. A heating device comprising a silencer device according to claim 1.

* * * * *